United States Patent [19]

Yamaashi et al.

[11] Patent Number: 4,955,255
[45] Date of Patent: Sep. 11, 1990

[54] POWER TRANSMISSION SYSTEM FOR A MOTOR VEHICLE WITH AN AUTOMATIC TRANSMISSION

[75] Inventors: Shunji Yamaashi; Yoshimitsu Arai, both of Tokyo, Japan

[73] Assignee: Fuji Jukogyo Kabushiki Kaisha, Tokyo, Japan

[21] Appl. No.: 282,023

[22] Filed: Dec. 7, 1988

[30] Foreign Application Priority Data

Dec. 16, 1987 [JP] Japan ............................... 62-190968

[51] Int. Cl.⁵ ............................................ B60K 41/04
[52] U.S. Cl. ................................. 74/856; 123/198 D; 192/0.055
[58] Field of Search ................. 74/856, 857, 859, 861, 74/863, 866, 878; 123/198 D, 198 DB, 198 DC; 192/0.055, 0.094, 1.2

[56] References Cited

U.S. PATENT DOCUMENTS

| | | | |
|---|---|---|---|
| 4,166,442 | 9/1979 | Henderson et al. | 192/30 W X |
| 4,350,234 | 9/1982 | Suga et al. | 192/0.055 X |
| 4,493,303 | 1/1985 | Thompson et al. | 123/357 |
| 4,499,733 | 2/1985 | Farr et al. | 123/198 D X |
| 4,520,694 | 6/1985 | Eschrich et al. | 74/858 |
| 4,522,175 | 6/1985 | Kamifuji et al. | 123/198 D X |
| 4,653,445 | 3/1987 | Book et al. | 123/198 D X |
| 4,680,711 | 7/1987 | Miyawaki | 123/198 DB X |
| 4,716,788 | 1/1988 | Kita | 74/858 |
| 4,796,583 | 1/1989 | Nagasaka et al. | 123/198 D X |

FOREIGN PATENT DOCUMENTS 62-41954 3/1987 Japan.

Primary Examiner—Leslie A. Braun
Assistant Examiner—Chris Campbell
Attorney, Agent, or Firm—Martin A. Farber

[57] ABSTRACT

A brake switch is provided for producing a brake signal when a brake pedal of the vehicle is depressed. A vacuum switch is provided for producing an acceleration signal when the pressure in an intake passage exceeds a predetermined value. Engine speed sensor is provided for producing an engine speed signal when the engine speed exceeds a predetermined speed. In response to the brake signal, acceleration signal and engine speed signal, a control unit operates to cut off the transmission of power of an engine and shifts the transmission to the neutral range.

2 Claims, 3 Drawing Sheets

POWER TRANSMISSION SYSTEM FOR A MOTOR VEHICLE WITH AN AUTOMATIC TRANSMISSION

BACKGROUND OF THE INVENTION

The present invention relates to a control system for a motor vehicle with an automatic transmission, and more particularly to a power transmission control system for the motor vehicle.

An automatic transmission for a motor vehicle is provided with various operational ranges such as a first gear range (1), a second gear range (2), a drive range (D), a neutral range (N), a reverse range (R), and a parking range (P). The selection of these ranges is performed by manipulating a selector lever. Recently, the selection of ranges has been performed by an actuator in accordance with an electric signal produced by operating a selector switch (see Japanese Utility Model Application Laid-Open No. 62-41954).

In any case, a driver must operate the selector lever or switch in order to select the operational range, or turn off an engine key in order to stop the engine. However, in an emergency when the engine speed increases excessively because of failures, it is difficult for the driver to shift the transmission to the N range or turn off the engine key momentarily. Accordingly, an accident caused by an excessive engine speed cannot be prevented.

SUMMARY OF THE INVENTION

The object of the present invention is to provide a system which automatically cuts off the power of the engine when an abnormal condition in the power transmission system is detected, thereby preventing an accident.

According to the present invention, there is provided a power transmission system for a motor vehicle with an automatic transmission comprising a brake switch for producing a brake signal when a brake pedal of the vehicle is depressed, a vacuum switch for producing an acceleration signal when pressure in an intake passage exceeds a predetermined value, an engine speed sensor for producing an engine speed signal when engine speed exceeds a predetermined speed, and means responsive to the brake signal, acceleration signal and engine speed signal for cutting off transmission of the power of an engine, wherein the means operates to shift the transmission to the neutral range.

In an aspect of the invention, the means operates to stop the engine.

The other objects and features of this invention will become understood from the following description with reference to the accompanying drawings.

DETAILED DESCRIPTION OF THE PREFERRED EMBODIMENT

Figure 1:
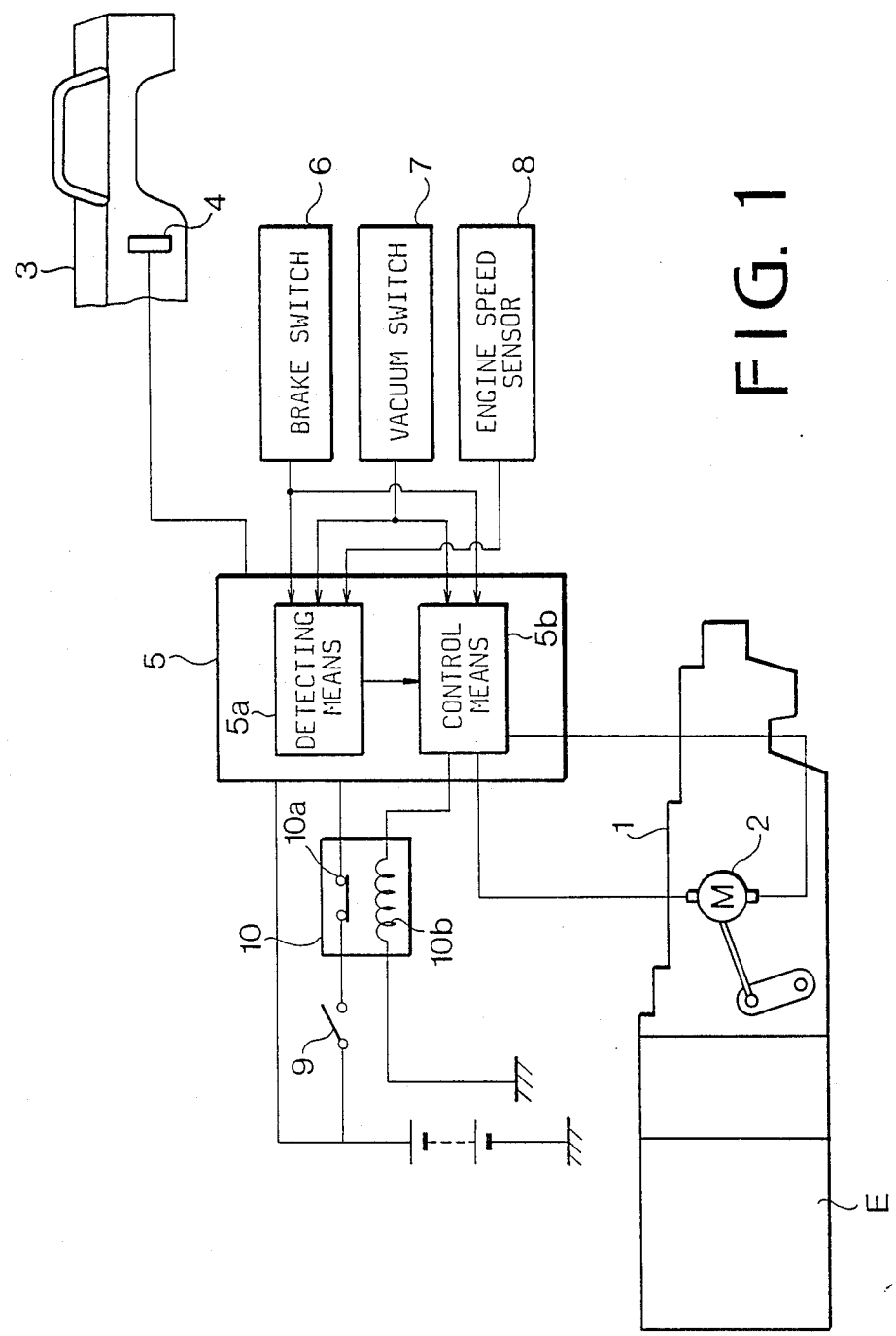
FIG. 1 is a schematic illustration showing a system according to the present invention.

Referring to FIG. 1, an automatic transmission 1 for transmitting the power of an engine E of a motor vehicle has an actuator 2 for selecting an operation range of the transmission 1. A range select switch 4 is provided on an instrument panel 3. The range select switch 4 is connected to a control circuit 5 which is in turn connected to the actuator 2. For example, if the D-range is selected by operating the range select switch 4, a selection signal is applied to the control circuit 5 which produces an output signal for actuating the actuator 2. Thus, the actuator 2 is actuated to shift the range of the transmission 1 to the D-range.

The control circuit 5 is applied with output signals from a brake switch 6, a vacuum switch 7, and an engine speed sensor 8. The vacuum switch 7 is provided in an intake passage, for example in a throttle chamber downstream of a throttle valve of the engine. The brake switch 6 is turned on when a brake pedal of the vehicle is depressed, so that a braking operation is detected. The vacuum switch 7 is turned on to produce an acceleration signal, when the pressure in the throttle chamber of the engine exceeds a predetermined value because of a large opening degree of the throttle valve, so that acceleration of the engine is detected. The engine speed sensor 8 produces an engine speed signal when the engine speed exceeds a predetermined speed (for example 2000 rpm).

The control circuit 5 further has abnormal condition detector means 5a and control means 5b. The abnormal condition detector means 5a is applied with signals from brake switch 6, vacuum switch 7, and engine speed sensor 8, and operates to detect an abnormal condition when the engine speed exceeds 2000 rpm and the pressure in the throttle chamber is below a predetermined value in spite of the depression of the brake pedal.

In accordance with the detection, the control means 5b in response to output signals of the brake switch 6 and the vacuum switch 7 produces an abnormal signal which is applied to the actuator 2. The actuator 2 is actuated to forcibly shift the transmission 1 to the N range.

Further, a relay 10 comprising a contact 10a and a coil 10b is provided for stopping the engine operation. Namely, the contact 10a is connected in an ignition circuit having an ignition switch 9 and the coil 10b is connected to the control circuit 5 so as to be applied with the abnormal signal. When the abnormal signal from the deciding section is applied to the coil 10b, the relay 10 is excited to open the contact 10a so that the engine stops.

Figure 2:
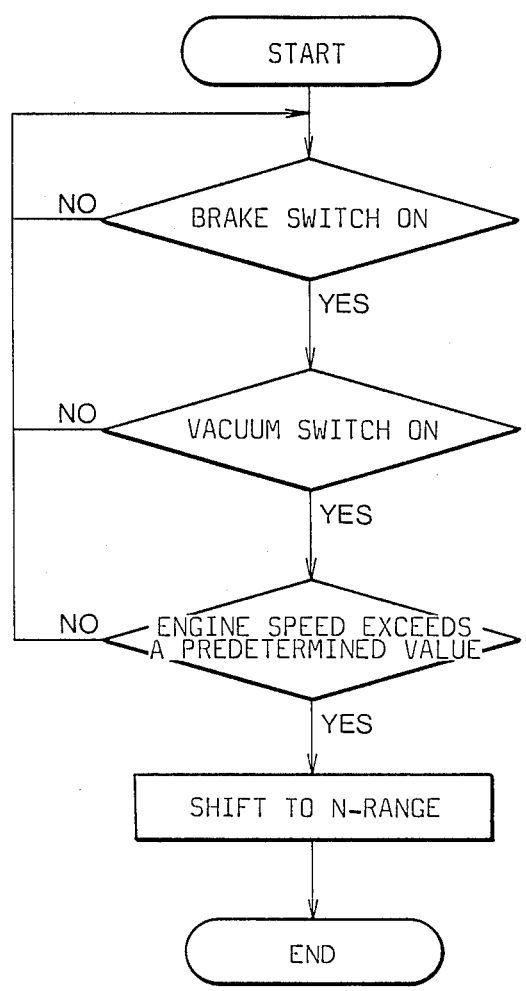
FIGS. 2 and 3 are flowcharts each, showing an operation of the system.

Referring to FIG. 2 showing an operation of the system, when the brake pedal is depressed, the brake switch 6 produces a brake signal. Thus, the braking operation is determined. It is determined whether the vacuum switch 7 is turned on or not. If the switch 7 is turned on, it is determined that the engine is in an accelerated condition in spite of the braking operation. Further, it is determined whether the engine speed exceeds 2000 rpm or not. When the engine speed exceeds 2000 rpm, an abnormal condition is decided so that the abnormal signal is generated from the control circuit 5. Thus, the actuator 2 is actuated to shift the transmission to the N range. Accordingly, the transmission of power of the engine is cut off.

If the brake switch 6 is turned off, the vacuum switch 7 is turned off, or the engine speed is less than 2000 rpm, the program returns to the start.

Figure 3:
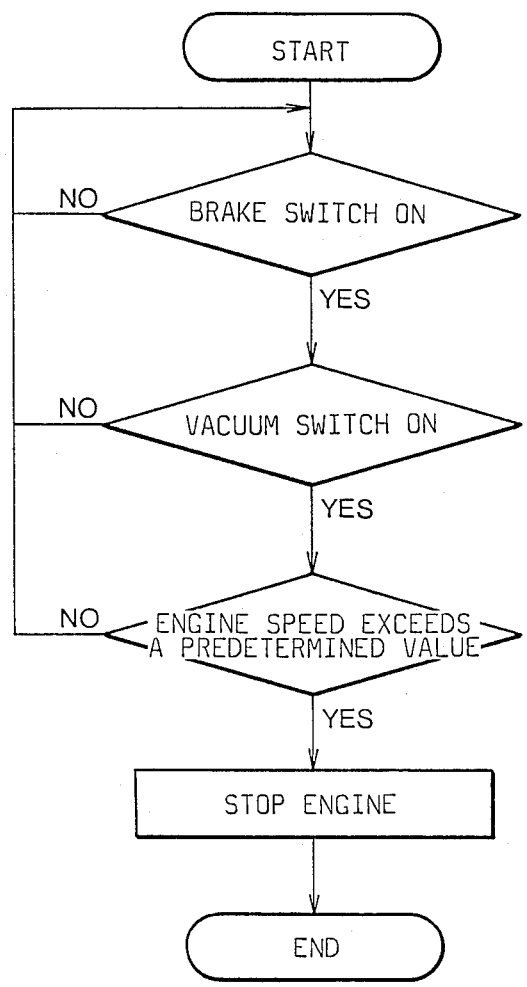

FIG. 3 shows another operation of the system. When the abnormal signal is generated, the coil 10b of the relay 10 is excited to open the contact 10a. Thus, the engine stops, thereby preventing an accident.

In the present invention, either of two systems of FIGS. 2 and 3 can be alternatively selected. Hence, the system of FIG. 3 can be employed for the automatic transmission operated by a manual selector lever.

In accordance with the present invention, since the motor vehicle is easily and quickly stopped only by the braking operation, an accident caused by failures in the engine and/or in the power transmission system can be prevented without turning off the ignition key.

Since there are two means for detecting abnormal condition, misjudgement of the detected abnormal conditions can be prevented.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A power transmission system for a motor vehicle with an automatic transmission operatively connected to an engine comprising:
   a brake switch for producing a brake signal when a brake pedal of the vehicle is depressed;
   a vacuum switch for producing an acceleration signal when pressure in an intake passage exceeds a predetermined value;
   an engine speed sensor for producing an engine speed signal when engine speed exceeds a predetermined speed; and
   means responsive to the brake signal, acceleration signal and engine speed signal for cutting off transmission of power of the engine; wherein
   said means operates to shift the transmission to a neutral range.

2. The system according to claim 1, wherein said means operates to stop the engine.

* * * * *